United States Patent [19]

Baker et al.

[11] 4,110,046
[45] Aug. 29, 1978

[54] OPTICAL APPARATUS AND METHOD

[75] Inventors: Lionel Richard Baker, Orpington; Tadeusz Wojtowicz, London, both of England

[73] Assignee: National Research Development Corporation, London, England

[21] Appl. No.: 740,542

[22] Filed: Nov. 10, 1976

[30] Foreign Application Priority Data

Nov. 14, 1975 [GB] United Kingdom ............... 47058/75

[51] Int. Cl.² ............................................. G01B 9/00
[52] U.S. Cl. .................................... 356/124; 356/127
[58] Field of Search ............... 356/124, 125, 126, 127, 356/154, 155, 111

[56] References Cited

U.S. PATENT DOCUMENTS

| 2,292,968 | 8/1942 | Peters | 356/155 |
| 3,438,713 | 4/1969 | Heynacher et al. | 356/124 |
| 3,519,358 | 7/1970 | Kuttner et al. | 356/124 |
| 3,783,296 | 1/1974 | Blevins | 356/111 |
| 3,792,272 | 2/1974 | Harte et al. | 356/201 |

OTHER PUBLICATIONS

Cox, A. *Optics;* London: Focal Press, Eleventh edition, 1956, pp. 253, 255, 258, 259, 260.
Jenkins et al. *Fundamentals of Optics,* Third Edition, New York: McGraw-Hill. 1957, pp. 157–158.

*Primary Examiner*—John K. Corbin
*Assistant Examiner*—R. A. Rosenberger
*Attorney, Agent, or Firm*—Hane, Roberts, Spiecens & Cohen

[57] ABSTRACT

Optical test apparatus and method for testing various parameters of a lens system such as a T.V. lens system. A single apparatus may be used for testing the modulation transfer function, glare, spectral transmission, relative field illuminance, transverse color, T stop, and back focal distance.

The apparatus comprises a pin hole light source and an analyzer means in which the lens may be mounted including a set of screens carrying varying patterns for measuring different parameters. The light transmitted through the screens is measured by a light detector means and the output signal is analyzed to provide a measurement of the parameters.

21 Claims, 12 Drawing Figures

OPTICAL APPARATUS AND METHOD

BACKGROUND OF THE INVENTION

The present invention relates to optical apparatus, and in particular optical component test apparatus and a method of testing optical components.

In the television industry in particular, there has arisen a need to test the lenses in television cameras periodically. The requirement arises since errors in the transmitted picture from a television camera might be caused by errors in the lenses in the particular camera or by other errors within the camera. Furthermore, television camera lenses are often subjected to severe conditions and scratches, gouges and other faults may develop in the lenses.

The present invention provides apparatus and method for testing such television camera lenses although, of course, it is not restricted to that use. For example, the apparatus might be used to test lenses in movie cameras and indeed, other suitable lenses and, even, with suitable modification of the apparatus, other optical components such as optical mirrors.

Throughout the Specification we shall refer to the use of light but it will be understood that the apparatus, with suitable modifications, might equally be used in non-optical wavelengths, such as ultraviolet and infrared and the principles might be used for testing optical components operating at these other wavelengths.

SUMMARY OF THE INVENTION

According to a first aspect, the invention provides a method of measuring a predetermined parameter of an optical component comprising inserting the optical component under test in an analyser means, aligning a light generator means in a desired position relative to the optical axis of the optical component under test, the light generator means including a light source and the analyser means including a light detector, selecting one of a set of screens which includes a pattern which pertains to said predetermined parameter, mounting the selected screen between the light detector and the optical component under test across the optical axis, and processing the signal detected by the light detector means to measure the desired parameter.

According to a further aspect the invention also provides optical component test apparatus comprising light generator means including a light source, analyser means, signal processor means, means for passing the output signal from the analyser means to the signal processor means, and a set of screens, the analyser means including means for mounting the optical component under test, light detector means for producing said output signal, and mounting means for mounting a selected one of the set of screens so that it extends across the optical axis between the light detector means and the optical component under test, the set of screens carrying patterns for testing different parameters of the optical component. The set of screens may be utilised to measure the degree of glare produced by the optical component, the modulation transfer function of the optical component, the transverse colour of the optical component and the distortion of the optical component.

The light generator means may include a beam chopper and the signal processor means includes an electronic filter to eliminate from the detected signal that portion attributable to ambient light.

The present invention also provides in or for an optical component test apparatus, an analyser means comprising means for mounting the optical component under test, light detector means for producing an output signal, means for mounting a selected one of a set of screens so that it extends across the optical axis between the light detector means and the optical component under test each screen carrying a pattern for testing different parameters of the optical component and a light source which may selectively pass light along the optical axis through a screen in the mounting means and through the optical component in a direction away from the light detector means.

There may be provided means for moving the screen mounting means transversely of the optical axis, the moving means preferably comprising a motor and a cam rotatably driven by said motor.

There may be provided means for rotating the screen mounting means about the optical axis whereby the screen is rotatably moved to a selected orientation. This means for rotating the screen mounting means may incorporate a locking means.

There is preferably provided a pivoted mirror between the optical component under test and the light detector means to selectively direct light from an optical component under test to the light detector means and to direct light from the light source to an optical component under test.

Alternatively, there may be provided a transversely movable member mounting the light source to selectively move the light source between a position in which the light source interposes between the light detector means and an optical component under test and a position in which light may pass from an optical component under test to the light detector means.

BRIEF DESCRIPTION OF THE PREFERRED EMBODIMENT

Figure 1:
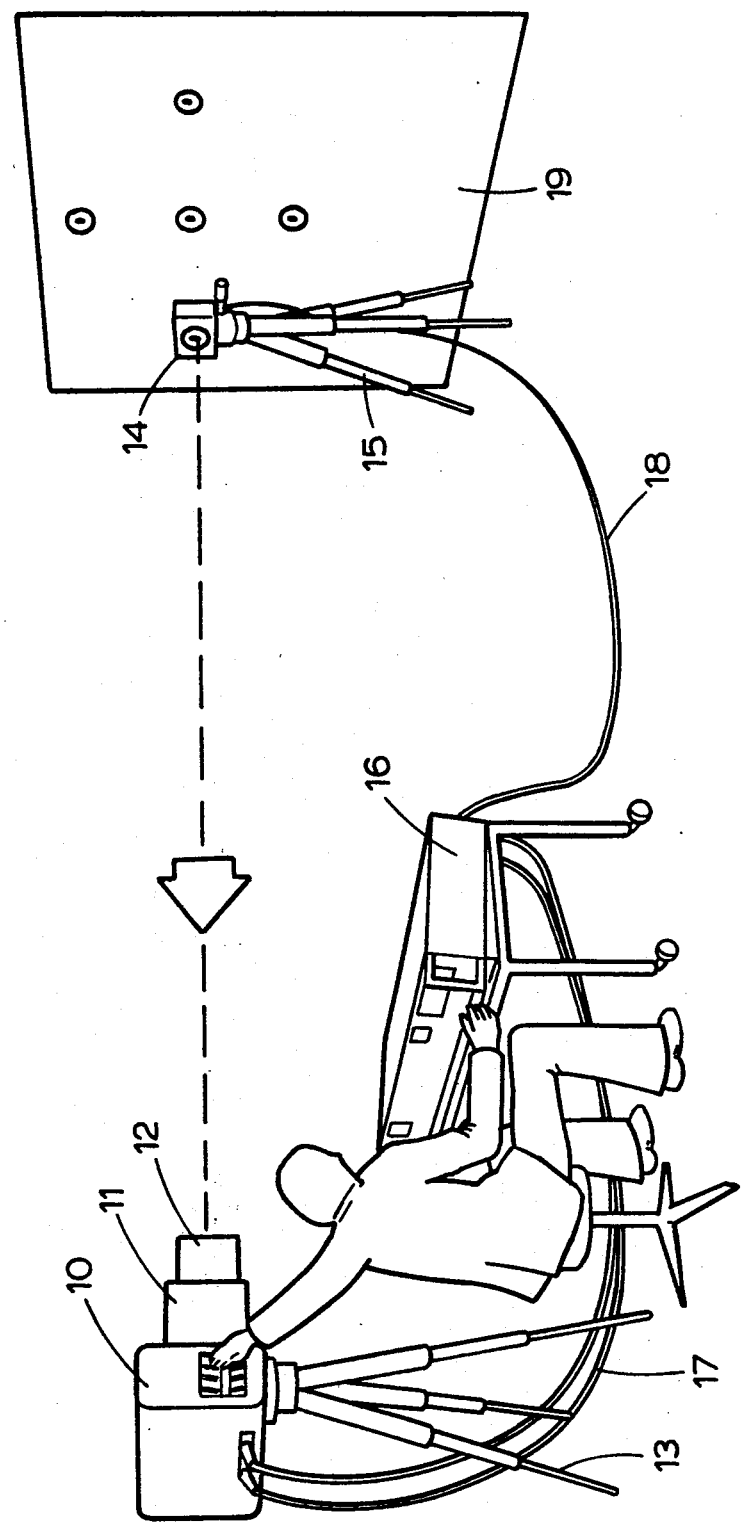
FIG. 1 is a general view of the arrangement of the apparatus.

FIG. 1 illustrates the relative set-up of various parts of the apparatus, there being illustrated analyser means 10 incorporating lens mounting means 11 mounting a test lens 12, the analyser means 10 being mounted on a suitable tripod 13. There is also illustrated a light generator means 14 also mounted on a suitable tripod 15. A signal processor 16 is provided which is connected by means of suitable cables 17 and 18 respectively to the analyser means 10 and the light generator means 14.

Situated behind the light generator means 14 is a suitable screen 19.

Figure 2:
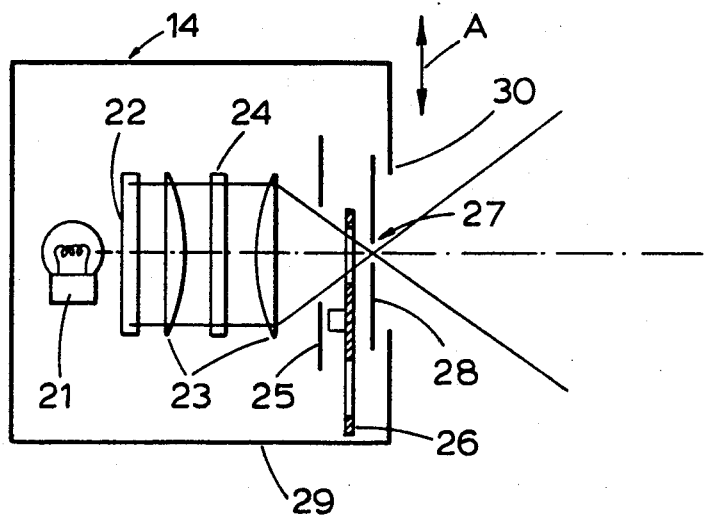
FIG. 2 is a diagrammatic arrangement of a first light generator means.

The light generator means 14 is illustrated in more detail but in diagrammatic form, in FIG. 2. The light generator means 14 comprises a 100 w tungsten iodine lamp 21 and then working along the optical axis in order, a diffuser 22, a condensing lens system 23, an array of filters 24 which may be selectively inserted into the optical path, the filters including coloured filters to simulate the required spectral characteristics and a neutral density filter, an iris diaphragm 25, a mechanical chopper 26 and a pin hole 27 in a focusing screen 28. The chopper may be of conventional construction comprising a motor driven disc, the outer periphery of which includes cut out portions which chop the light passed by the light generator means at a regular frequency. The pin hole 27 and its associated focusing screen may be changeable since different diameter pin holes may be required for different purposes. The parts 21 to 28 are incorporated in a housing 29 having a front aperture 30. The housing 29 is mounted on the tripod 15 but means is provided for allowing transverse movement of the light generator means 14 relative to the tripod 15 for adjustment purposes as is suggested by the arrows A. The angle of light emerging from the pin hole 27 will be sufficient to cover the field of view of the lens under test. For most cases, 60° would be sufficient.

Figure 3:
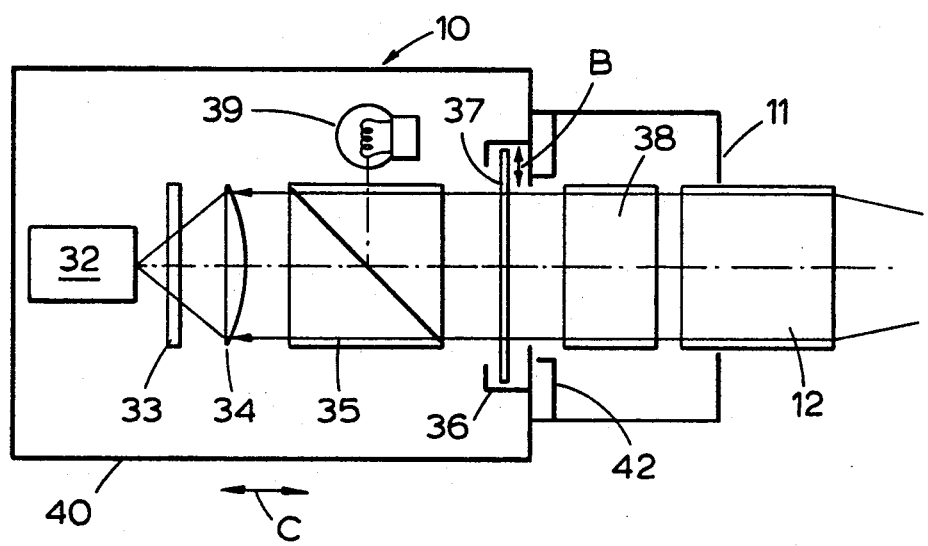
FIG. 3 is a diagrammatic arrangement of a first analyser means.

The analyser means 10 is similarly illustrated in FIG. 3. The analyser incorporates, along the optical axis in order, an S-20 type photomultiplier 32 with associated diffuser 33, a lens 34, a pivoted mirror 35 and an arrangement of condensing optics (not shown), a mounting means 36 for a screen 37 which extends transversely across the light path, an optical block 38, means 11 for mounting the lens under test and the lens under test 12. There is also provided a 100 w tungsten iodine lamp 39 to one side of the optical axis light from which may be brought into the optical axis by pivoting the mirror 35 in which position the photomultiplier 32, diffuser 33 and lens 34 are hidden from the lens 12.

The optical block 38 is incorporated behind the lens since in a colour television camera, there is provided behind the lens a beam splitter to provide three separate colour beams for the three colour signals. Thus to reproduce the conditions within the camera, it is necessary to replace the beam splitter by an equivalent (but non-beam splitting) optical block 38.

The elements 32, 37 and 39 are incorporated within a housing 40 having an aperture at 41. Surrounding the aperture 41 is a reference surface 42.

The mounting means 36 including a motor drive (not shown) for moving the mount transverse the optical axis in the direction of arrows B. The mounting means 36 is also movable along the optical axis in the direction of arrows C for focusing purposes and may be rotated about the optical axis for reasons to be described.

Figure 4A:
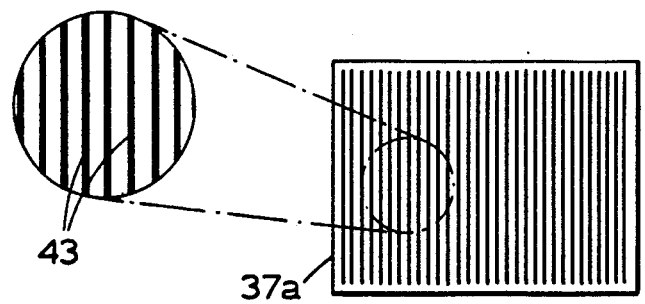
FIGS. 4a to 4d show different screens for use with the apparatus of FIGS. 1 to 3.

A variety of different screens 37 may be incorporated in the mount 36 for analysing different parameters of the lens 12. The types of screen are diagrammatically illustrated in FIGS. 4a to 4d. Screen 37a in FIG. 4a is in the form of a graticule incorporating a number of vertically arranged regular opaque and transparent lines 43. These are closely spaced at a desired spatial frequency.

Figure 4B:
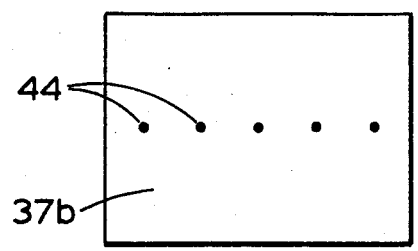
Figure 4C:
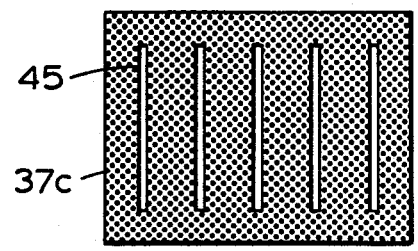

In FIG. 4b the screen 37b comprises a transparent screen but incorporates a number of light absorbing spots 44, the centre one of which is on the optical axis and the others of which are situated at other parts of the screen as desired. In FIG. 4c, the screen 37c is opaque but incorporates a number of vertical transparent slits 45, one of which is aligned with the optical axis and the others of which are distributed as required.

Figure 4D:
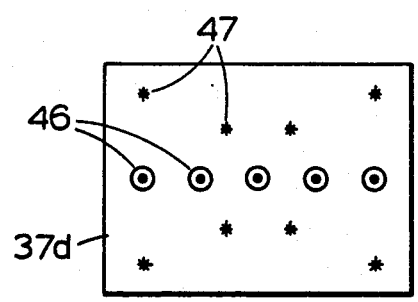

In FIG. 4d the screen is transparent apart from a number of opaque circles 46 and other figures 47 as desired.

The signal processor 16 incorporates generally conventional electronics including a dual band pass filter and amplifier for receiving the signal from the photomultiplier 32 and a reference carrier signal derived from the chopper 26 which thereby eliminate the effect of ambient light falling on the photomultiplier, a phase sensitive detector (PSD), a low pass filter, a high pass filter, a rectifier, a further low pass filter and a meter. It further includes a stepping motor control and suitable power supplies.

The apparatus so far described is operated in the following manner. The lens to be tested is mounted on the lens mounting means 11 of the analyser means 10 and is adjusted in the same way on a camera. As television camera lenses are usually zoom lenses, it will be adjusted so as to give the best focus across the desired zoom range. The analyser means 10 is arranged to work in its projection mode during this setting up operation by moving the pivoted mirror to a position in which light from the lamp 39 is projected through the lens 12. The screen 37d is selected for use during the setting up operation and is therefore mounted in the mount 36. The light generator means 14 is situated, as shown in FIG. 1, in front of the screen 19 and so an image of the screen 37d is projected onto the screen 19. Generally it will be desired to arranged the light generator means 14 on the optical axis and this can be arranged by aligning the light generator means 14 with the image of the central circle 46. This is assisted by the fact that the central circle 46 includes a central dot which can be aligned with the pin hole 27, and since the pin hole 27 is surrounded by a focusing screen, the image of the central dot may be focused on to that focusing screen 28. The focusing is carried out by moving the mount 36 along the optical axis. It will be appreciated that for some purposes, the light generator means 14 is to be mounted off axis and it would then be mounted so as to coincide with a different circle 46 of the screen 37d. The light generator means 14 is then switched to its analyser mode by moving the pivotable mirror 35 out of the optical axis so that light received by the lens 12 is passed to the photomultiplier 32. If further more accurate adjustment of the system is required then the screen 37d can be replaced by the screen 37a and the system varied to maximise the signal on MTF as will be clear hereafter.

We shall now describe the method of utilising the various screens shown in FIG. 4 in turn to measure various required parameters.

First of all, to measure the modulation transfer function (MTF) the screen 37a is mounted in the mount 36 to replace the screen 37d. It will be understood that the lines 43 are arranged vertically so that when the mount 36 is driven transversely of the optical axis by the motor the vertical lines 43 move horizontally.

It would be understood that, as the screen 37a is in the focal plane of the lens 12 an image of the pin hole 27 is formed on the screen 37a and thus a varying signal will be passed to the photomultiplier 32 as the screen 37a is driven transverse the optical axis. From this varying signal can be derived a value of the MTF for the fixed spatial frequency of the lines 43 of the screen 37a as is conventionally known. From the value of the MTF derived by the signal processor 16 faults in the lens system under test can be determined such as tilted or decentred components and inclusions. Measurements of the MTF may be made, not only with the light generator means 14 on the optical axis but off the optical axis in which case the light generator means may be aligned with other circles 46 as desired. Furthermore, various measurements of MTF should be taken with the zoom lens at various settings and, if desired, at different conjugate positions by moving the light generator means 14 closer to the analyser means 10.

The apparatus may also be used to examine the glare produced by the lens 12. In this instance the light generator means 14 is aligned with the image of one of the circles 46 of the screen 37d as before. However, in this case, the screen 37b is then inserted and the analyser means 10 is switched to its analysing mode. It will be appreciated that in the image plane of the lens 12 the image of the pin hole 27 will be aligned with one of the opaque spots of the screen 37b so that, in the absence of any glare produced by the lens 12, no light will reach the photomultiplier from the light generator means 14. In practice, of course, some light reaches the photomultiplier from the glare produced by the lens 12 and the photomultiplier signal will be a measure of the degree of glare produced by the lens 12. To measure its normalised value the neutral density filter 24 is then incorporated into the light path within the light generator means 14 to attenuate the beam, the generator means 14 is then displaced so that direct light is no longer passed to the opaque spot on the screen 37d but all passes to the photomultiplier and the signal from the photomultiplier is then measured again. The second reading, taking into account attenuation by the neutral density filter is used to normalise the first signal to give a normalised glare measurement.

The glare reading can be repeated at required field positions by aligning the light generator means 14 successively with different areas 44. Furthermore, in this instance, indication of glare due to a source which is out of the field of view can also be recorded by moving the light generator means 14 out of the field of view of the lens 12 and measuring the glare from the light generating means 14.

The spectral transmission of the lens may also be measured. The light generator means 18 is positioned on the optical axis as above described, and the beam from the light generator means is reduced to a narrow pencil beam. The pencil of light is arranged so that it goes through the lens 12 unobstructed. The signal from the photomultiplier 32 is recorded and the procedure is repeated with the required spectral characteristic by inserting the desired colour filter 24. The lens 12 is then removed and the measurements repeated. The spectral transmission is given by the ratio of the light transmitted with and without the lens 12 for the range of colour filters used.

To measure the relative field illuminance, the light generator means 14 is again placed on the optical axis and the light transmitted by the lens is measured and normalised to 100 units by manual adjustment. The generator means 14 is then moved to required field positions away from the optical axis and the light transmissions recorded at these points. These readings are thereby normalised to 100 units on axis measurement. In this way the variation of relative field illuminance over the field may be recorded.

It is desirable when carrying out this measurement that the light from the generator should be checked for uniformity during the measurement and if this light output is non-uniform this should be taken into account.

To measure the transverse colour the screen 37c is used. The light generator means 14 is positioned so that light therefrom passes through one of the slits 45. By moving the traversing mechanism on the light generator means by means of a micrometer a peak signal will be recorded from the photomultiplier 32 when the image of the pin hole 27 is exactly aligned with the respective slit 45.

The micrometer setting of the traversing mechanism is then recorded and the procedure repeated using selected colour filters noting the micrometer reading in each case. The amount of transverse movement between the different colour filters may be plotted with respect to the distance of the light generator means 14 from the optical axis by repeating the test using the different slits 45.

Distortion of lens may be measured by using the screen 37a and the analyser means 10 in the projection mode. The grating lines will be projected onto the screen 19 and may be checked for straightness by means of a ruler. The variation from straightness should be recorded as a function of the position in the field.

The T stop may also be measured for the lens since the T stop is a function of the transmission, already measured.

The back focal distance of the lens may also be measured. This is measured with respect to the reference surface 42 so as to be able to compare variation within the lens over a period of time. During the initial setting up proceding the screen 37 is accurately focused with respect to the lens 12 and light generator means 14. In that position, the screen 37 is in the back focal plane of the lens and a suitable scale provided on the means for moving the screen 37 along the optical axis will provide a measure of the back focal distance.

All measurements may be repeated for different azimuths by rotating the relevant screen around the optical axis.

Figure 5:
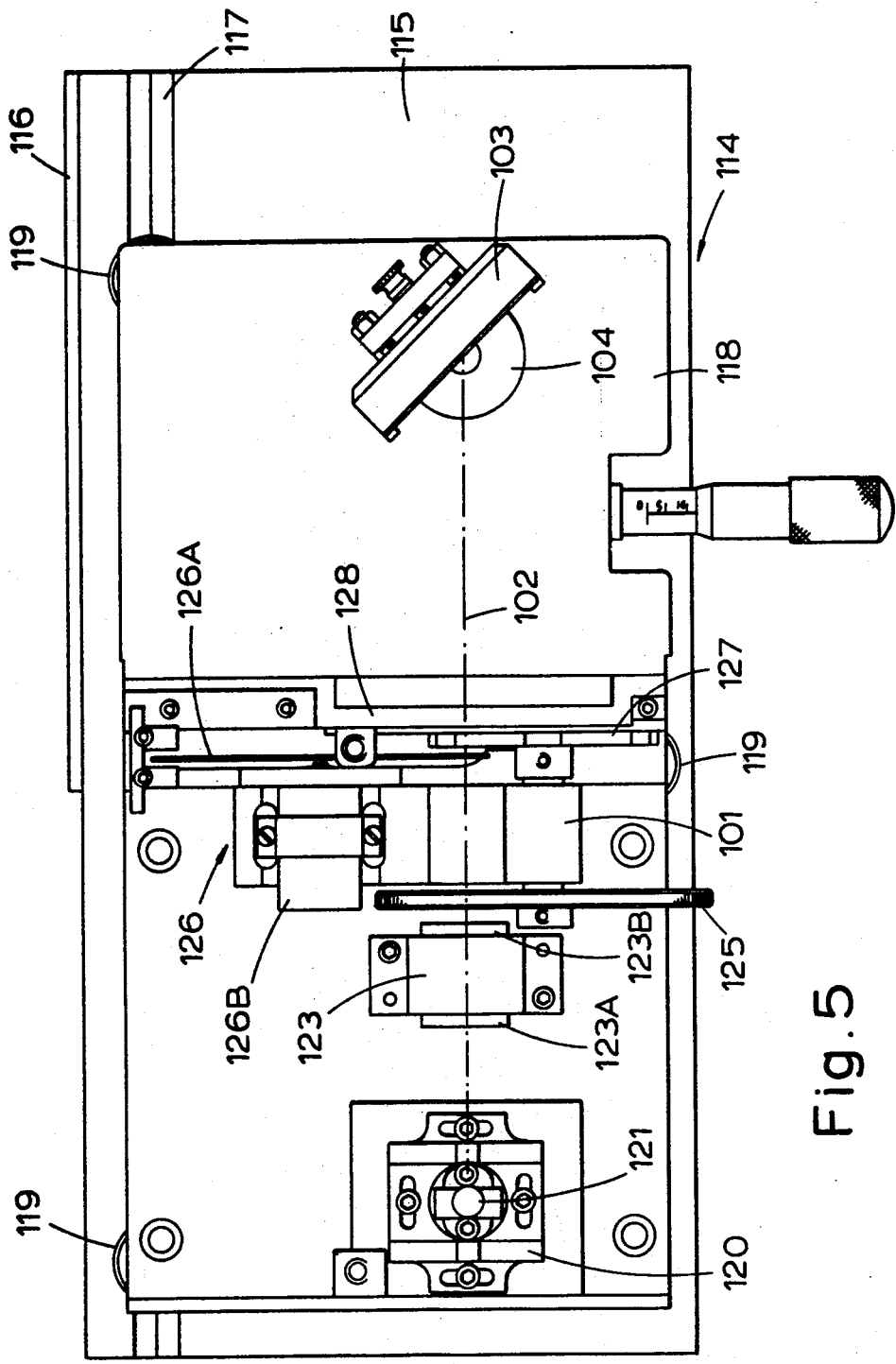
FIG. 5 is a plan view, with the cover removed, of a second arrangement of light generator means.
Figure 6:
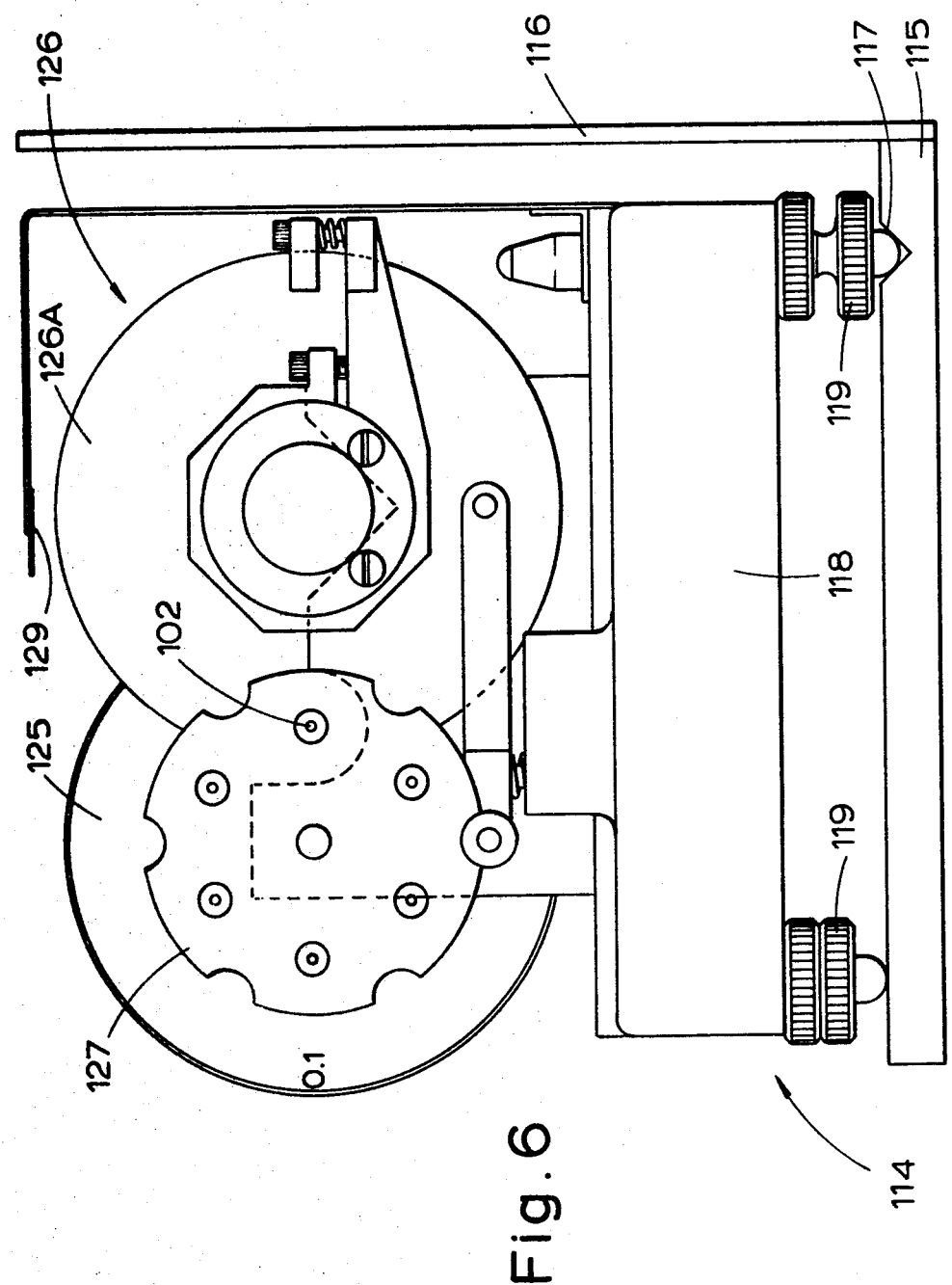
FIG. 6 is a front view, with the mirror removed, of the light generator means of FIG. 5.

FIGS. 5 and 6 as already described, illustrate an alternative light generator means 114. This light generator means is generally similar to the light generator means 14 of FIG. 2.

The light generator means 114 comprises a base 115 incorporating an upstanding back screen 116; a V groove 117 is provided along the back of the base 115; a base member 118 is mounted on the base 115 through three adjustable legs 119, two of which engage the V groove 117.

A 20 w tungsten iodide lamp 121 is adjustably mounted to the base 118 by a lamp mount 120. Two condensing lenses 123A and 123B forming a condensing lens system 123 suitably mounted on the base member 118. A rotatable aperture plate 125 is provided in place of the variable iris diaphragm 25 of FIG. 2, the plate incorporating a series of different size apertures which may be selectively aligned with the optical axis 102.

The aperture plate 125 is connected with a coaxial pin hole plate 127 which comprises a series of pin holes aligned with each aperture in the aperture plate 125. The aperture plate and pin hole plate form a unit which is rotatably mounted in a bearing journal 101 mounted on the base member 118.

A mechanical chopper 126 is provided in the form of a circular plate 126A having portions (not shown) of its surface cut-out. The circular plate 126A is rotated by means of a motor 126B mounted to the base member 118. As will be clear from FIG. 5 the axis of the mechanical chopper 126 and of the aperture plate/pin hole plate are parallel to one another and are on opposite sides of the optical axis 102.

The components 120 to 127 are mounted within a housing 129 although in FIGS. 5 and 6, the housing is removed for clarity. Surrounding the point where the optical axis leaves the housing 129 is a focusing screen 128.

Outside the housing 129 but mounted in the optical axis 102 is a mirror 103. The mirror 103 is mounted to the base member 118 by a rotatable mount 104 the vertical axis of the rotatable mount 104 passing through the optical axis 102 and passing up across the vertical mirror surface of the mirror 103. The mirror 103 may be rotated about the rotatable mount 104 by means of a micrometer 105 acting on an arm (not shown) linked to the rotatable mount beneath the base member 118.

This light generator means 114 is operated in generally the same way as the light generator means 14. However, the micrometer traversing arrangement of the light generator means 14 is replaced by the mirror 103. In order to cover the field of view of the lens under test, the light generator means may be moved to selected positions. To compensate for this movement, the mirror 103 is rotated about the vertical axis of the rotatable mount 104 so as to bring back the light path from the mirror 103 to the optical component under test. In this way, the field of view of the lens under test may be covered.

Figure 7:
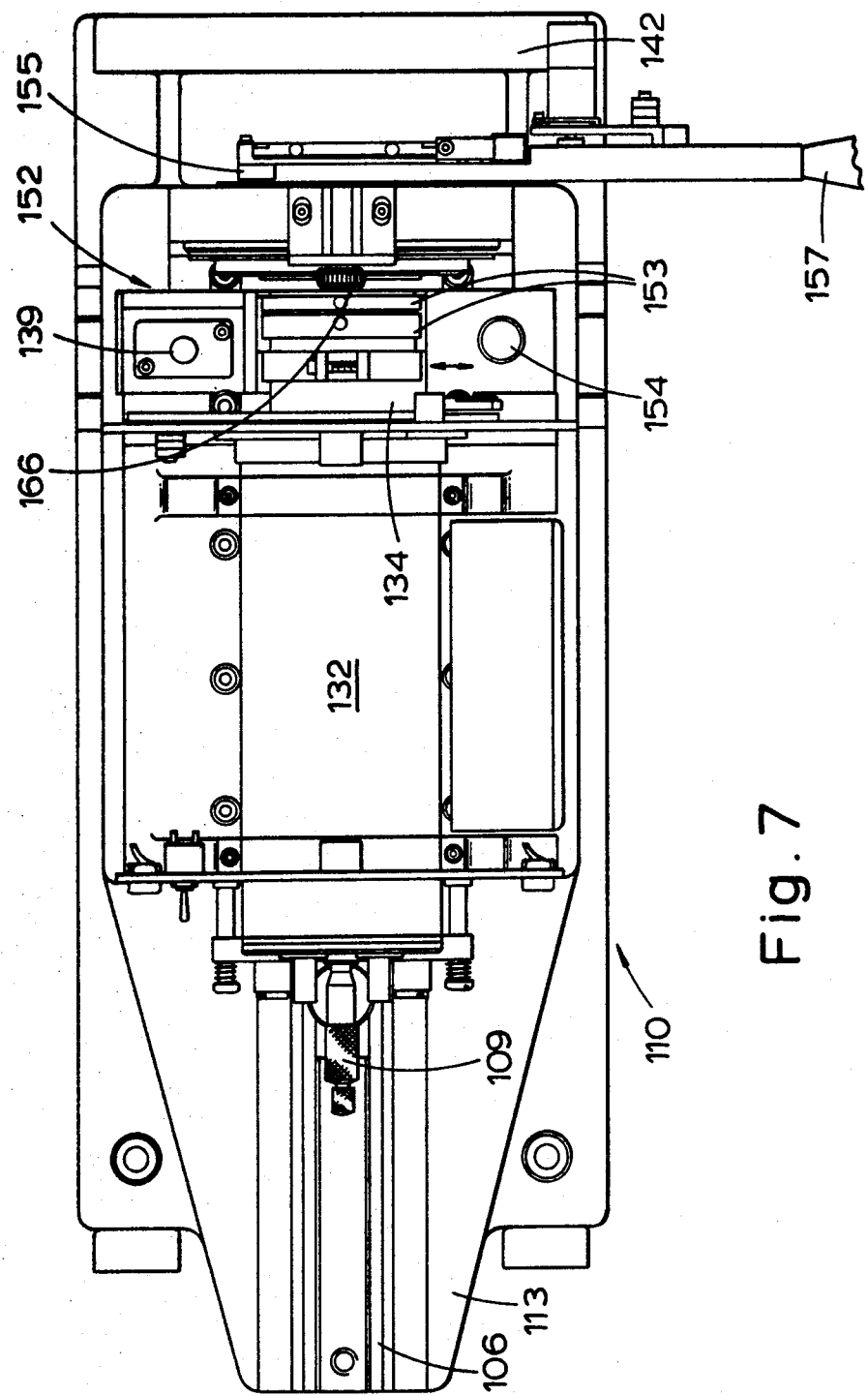
FIG. 7 is a plan view of a second arrangement of analyser means.
Figure 8:
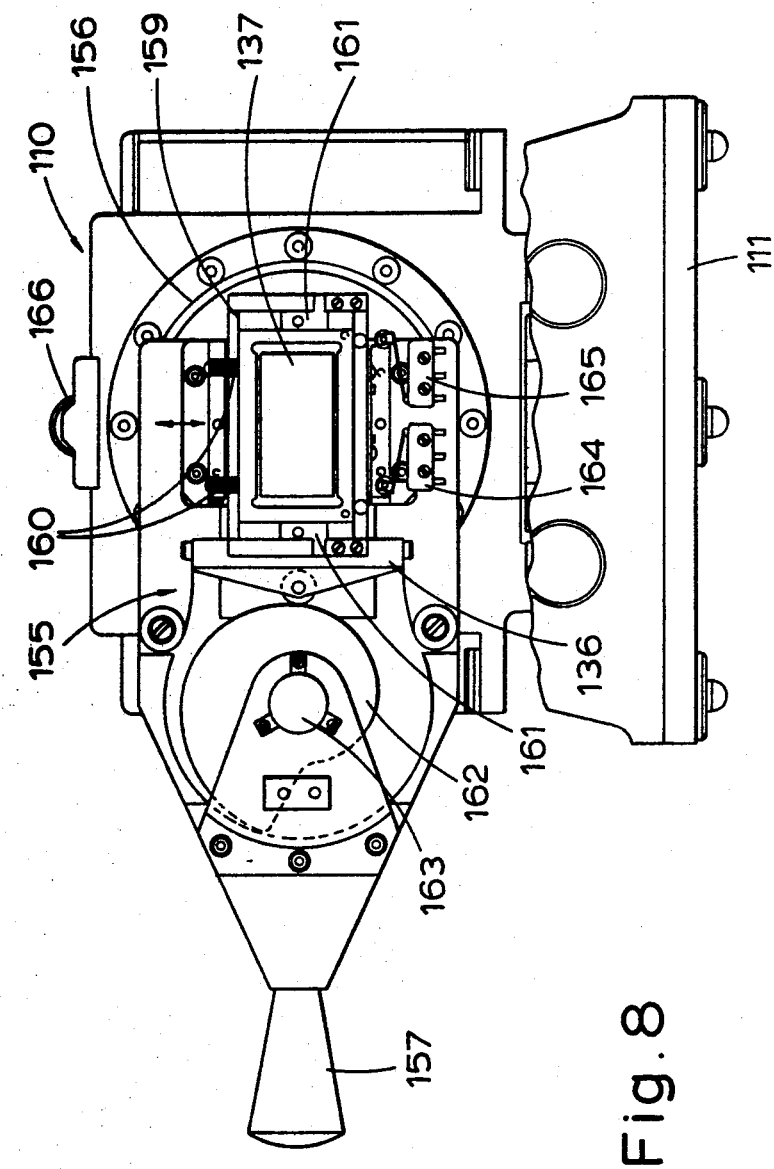
FIG. 8 is a front view of the analyser means of FIG. 7, and, FIG. 9 is a side view part in section of the analyser means of FIG. 7.
Figure 9:
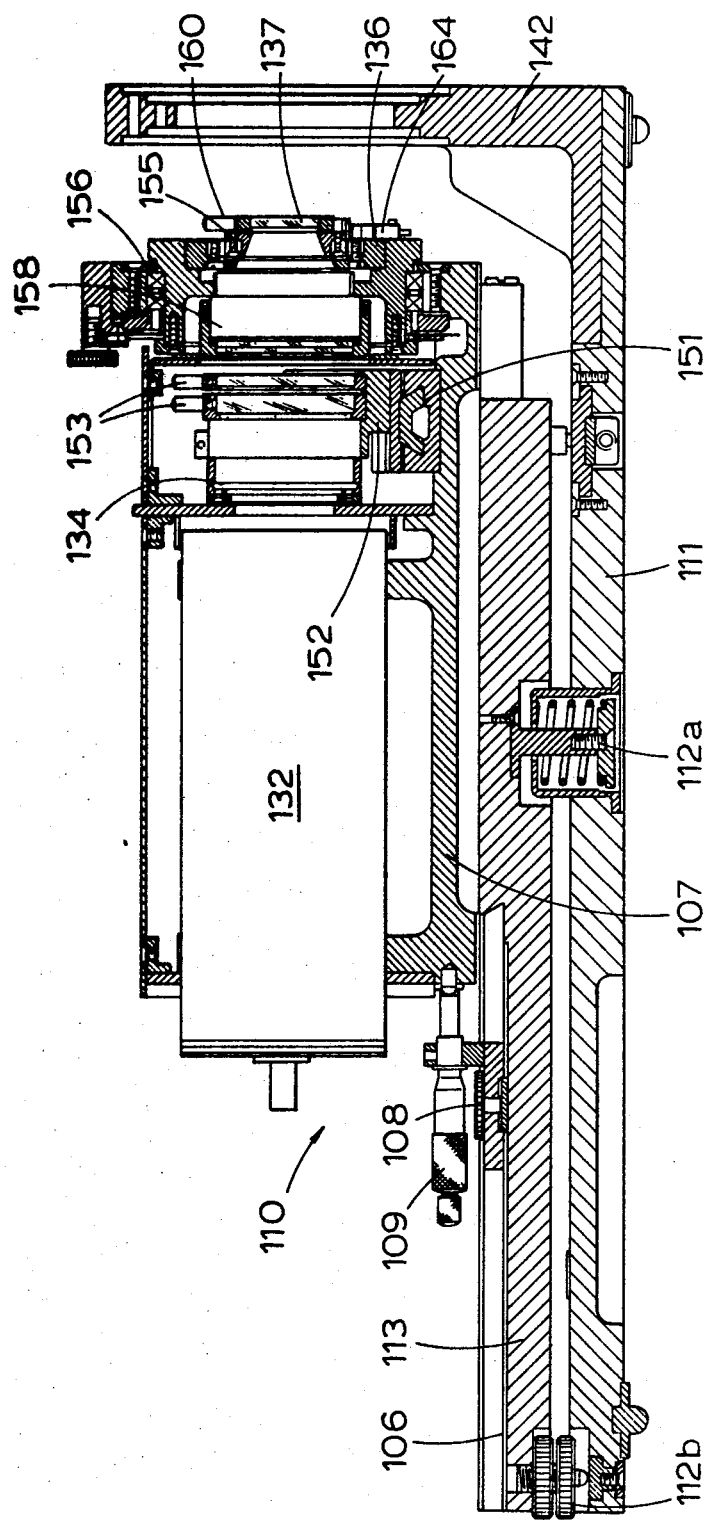

The alternative analyser means 110 is illustrated in FIGS. 7, 8 and 9. The analyser means 110 incorporates a first base member 111 on which is mounted a second base 113. The base 113 is mounted on the base 111 by means of a pin mounting 112a and two screw legs 112b. In this way, the base 113 may be suitably levelled.

The second base 113 incorporates a slide way 106. Mounted to slide on the slide way 106 is a mount 107 which can either be freely slid along the slide way by releasing the locking device 108 or can be slowly and adjustably moved along the slide way by locking the device 108 and moving the mount 107 by means of the micrometer 109.

The analyser 110 incorporates an S-20 type photomultiplier 132 mounted on the optical axis 150. In front of the photomultiplier 132 there is mounted on the mount 107 a transverse slide way 151 which mounts a carriage 152, the carriage 152 mounting a 100 w tungsten iodide lamp 139 and in a separate position transverse to the lamp 139 relative to the optical axis, an optical system comprising a condenser lens 134 and suitable filters 153. A handle 154 is provided on the carriage 152 to cause movement of the carriage 152 along the transverse slide way 151 so as to alternatively align either the lamp 139 or the optical system comprising the condenser lens 134 and filters 153 with the optical axis of the analyser means. In this way, the requirement for the mirror 35 in analyser means 10 is overcome.

For convenience, it is arranged that movement of the carriage 152 into the position in which the lamp 139 is aligned with the optical axis will automatically cause the illumination of the lamp 139.

At the end of the mount 107 is mounted a rotary mount 155 mounted to the mount 107 by means of an accurate ring bearing 156, the axis of which coincides with the optical axis of the analyser means 110. The rotary mount 155, incorporates a handle 157 by means of which it may be rotated about the optical axis and a lock member 166 for locking the rotary mount in a desired orientation.

Mounted to the rotary mount 155 is a screen 137 and beyond this is a condensor lens system 158. As will be clear from FIG. 9, the screen 137 incorporates a frame 159 and handles 160, the screen being slidingly mounted in the rotary mount 155 and held there by means of cooperating springs 161 which engage with the screen frame 159. The springs 161 are mounted to a subsidiary frame 136 which is mounted so as to be slidable in a direction transverse to the optical axis of the analyser means 10. As is clear from FIG. 9 this transverse movement may be provided by a cam 162 driven by a motor 163. Limit switches 164,165 are provided to reverse the direction of rotation of the motor 163 when the screen 137 reaches the limit of its transverse movement in either direction.

Mounted to the front of the base member 111 is an upstanding support member 142 for mounting the lens, and if required an optical block corresponding to the block 38 of FIG. 3.

The analyser process of FIGS. 7 to 9 operates in a similar way to the analyser means of FIG. 3. When used in its projecting mode, the carriage 152 is moved to the position in which the lamp 139 is on the optical axis and is illuminated, which positioning may be used, for example, during the setting up of the apparatus. When the carriage 152 is in its other position, light produced by the light generator means 114 is passed to the photomultiplier 132. Normally the apparatus will be used with the rotary mount 155 arranged so that the grating lines on a screen such as screen 37a or 37c will be vertical but under some circumstances, this orientation should be varied in which case the lock member 166 is released and the rotary mount 155 rotated about the optical axis until the rotary mount 155 is in the desired orientation. Thereafter the lock member 166 is suitably locked to prevent further rotation of the rotary mount 155.

It will be noted that the screen can be readily removed and replaced to facilitate the measurement of a variety of parameters in a short time.

It will be understood that with the apparatus described lenses such as television lenses can be readily tested in the field without a great deal of experience. In particular, it enables T.V. companies to test their own lenses without returning them to the manufacturer which might cause disruption of programme schedules. The lenses need only be returned to the manufacturer for repair or, in the case of zoom lenses for rebuilding when the apparatus of the present invention determines that the lenses are of an insufficiently good quality.

Furthermore the apparatus of the present invention can also be used by lens manufacturers and repairers for rapid testing of lenses when they have been built or rebuilt.

The invention is not restricted to the details of the foregoing example. In particular, other arrangements of the screens 37 may be provided as is convenient.

We claim:

1. A method of measuring a predetermined parameter of an optical component comprising inserting the optical component under test in an analyser means, aligning a light generator means in a desired position relative to the optical axis of the optical component under test by utilizing a selected screen of a set of screens including an indication of a predetermined position relative to the optical axis of the light generator means by projecting light from a subsidiary light source within the analyser means along the optical axis of the analyser means through the screen during the setting up operation, and by aligning the light generator means with the image of the indication, the light generator means including a light source and the analyser means including a light detector, selecting one of the set of screens which includes a pattern which pertains to said predetermined parameter, mounting the selected screen between the light detector and the light generator means, and processing the signal detected by the light detector to measure the desired parameter.

2. A method of measuring a predetermined parameter of an optical component comprising inserting the optical component under test in an analyser means including a light detector, selecting a first one of a set of screens which includes a pattern including at least one indication of a predetermined position relative to the optical axis of the optical component under test, mounting the first selected screen in the analyser means, passing light through the optical component under test and through the screen, aligning a light generator means with the image of an indication thus projected so that it is in a predetermined position relative to the optical axis of the optical component under test, selecting a second one of the set of screens which includes a pattern which pertains to said predetermined parameter, mounting the second selected screen in the analyser means and processing the signal detected by the light detector means to measure the desired parameter.

3. A method as claimed in claim 2 in which the first and second selected screens are the same screen.

4. A method as claimed in claim 2 in which the first and second selected screens includes a pattern including at least one small opaque area on a transparent background and the light generator means is aligned with the image of this small opaque area so that, if the optical component were perfect, all the light from the light generator means would impinge on this small opaque area of the screen, and determine from the signal produced by the light detector means the degree of glare produced by the optical component.

5. A method as claimed in claim 2 in which the second selected screen comprises a grating of opaque lines on a transparent background, and the analyser means includes means for moving the screen transversely of the optical axis and of the longitudinal axis of the grating lines, and determining from the signal produced by the light detector means the modulation transfer function of the optical component under test.

6. A method as claimed in claim 2 in which the second selected screen comprises a series of transparent linear areas on an opaque background and the light generator means is aligned so that light therefrom passes through one of the transparent areas of the pattern to the light detector means, the light generator means including means whereby it may be moved so that light from the light generator means is moved transversely of the optical axis through the analyser means and transversely of the linear areas, and determining from the signal produced by the light detector means the transverse colour of the optical component under test.

7. A method as claimed in claim 2 in which the second selected screen comprises a grating of opaque lines on a transparent background, the analyzer means includes a subsidiary light source for projecting light from the analyser means along the optical axis of the analyser means through the screen and through the optical component under test, focusing the image of the grating lines onto a screen forming part of the light generator means and checking the image of the grating lines for straightness by means of a ruler to thereby determine the distortion of the optical component under test.

8. In or for an optical component test apparatus, an analyser means comprising a detector means, means for mounting the optical component under test, means for mounting a selected one of a set of screens so that it extends across the optical axis of the optical component under test, the set of screens carrying respective patterns for testing different parameters of the optical component and a light source for selectively passing light along the optical axis through a screen in the mounting means and through the optical component in a direction away from the light detector means, so that with a first screen carrying a pattern including at least one indication of a predetermined position relative to the optical axis inserted in said mounting means, a light generator means may be aligned with the image of the indication so that it is in a predetermined position relative to the optical axis of the optical component under test, the light detector means being provided for receiving light from the light generator means thus aligned through a selected screen which pertains to the desired parameter of the optical component under test.

9. Apparatus as claimed in claim 8 in which there is provided means for moving the screen mounting means transversely of the optical axis.

10. Apparatus as claimed in claim 9 in which the moving means comprises a motor and a cam rotatably driven by said motor.

11. Apparatus as claimed in claim 8 in which there is provided means for rotating the screen mounting means about the optical axis whereby the screen is rotatable to a selected orientation.

12. Apparatus as claimed in claim 11 in which the means for rotating the screen mounting means incorporates a locking means so that the screen mounting means is lockable in a selected orientation.

13. Apparatus as claimed in claim 8 in which there is incorporated a pivoted mirror between the optical component under test and the light detector means pivotable to a first position to direct light from an optical component under test to the light detector means and pivotable to a second position to direct light from the light source to an optical component under test.

14. Apparatus as claimed in claim 8 in which there is provided a transversely movable member mounting the light source to selectively move the light source between a position in which the light source interposes between the light detector means and an optical component under test and a position in which light may pass from an optical component under test to the light detector means.

15. Optical component test apparatus comprising light generator means including a light source, analyser means, signal processor means, means for passing the output signal from the analyser means to the signal processor means, and a set of screens, the analyser means including means for mounting the optical component under test, light detector means for producing said output signal, and mounting means for mounting a selected one of the set of screens, the set of screens carrying patterns for testing different parameters of the optical component, the analyser means including a light source for selectively passing light along the optical axis through a screen in the mounting means and through the optical component in a direction away from the light detector means so that with a first screen carrying a pattern including at least one indication of a predetermined position relative to the optical axis inserted in said mounting means, the light generator means may be aligned with the image of the indication so that it is in a predetermined position relative to the optical axis of the optical component under test, the light detector means thereafter receiving light from the light generator means thus aligned through a selected screen which pertains to the desired parameter of the optical component under test.

16. Apparatus as claimed in claim 15 in which the set of screens comprise a first screen carrying a grating of closely spaced opaque lines on a transparent background for measuring the modulation transfer function of the optical component, a second screen including opaque areas for testing the glare of the optical component, a third screen including transparent slits on an opaque background for measuring the transverse colour of the optical component, and a fourth screen with various opaque areas distributed at predetermined points across the screen for setting up the apparatus.

17. Apparatus as claimed in claim 15 in which the screen mounting means is positioned so as to mount the screen at the back focal plane of an optical component under test.

18. Apparatus as claimed in claim 15 in which the analyser means includes means for moving the screen mounting means transversely of the optical axis between an optical component under test and the light detector.

19. Apparatus as claimed in claim 15 in which the light generator means includes a beam chopper and the signal processor means includes an electronic filter to eliminate from the detected signal that portion attributable to ambient light.

20. Apparatus as claimed in claim 15 in which there is provided means for rotatably mounting the means for mounting the screen about the optical axis, whereby the screen is movable to a selected orientation.

21. Apparatus as claimed in claim 15 in which the light generator means includes a mirror rotatable about an axis transverse the optical axis.

* * * * *